US012560202B2

(12) United States Patent
Lepine et al.

(10) Patent No.: US 12,560,202 B2
(45) Date of Patent: Feb. 24, 2026

(54) SUSPENSION BEARING UNIT WITH GASKET AND METHOD OF FORMING SAME

(71) Applicant: AKTIEBOLAGET SKF, Gothenburg (SE)

(72) Inventors: Thomas Lepine, Tours (FR); Paul Rabourdin, Tours (FR); Jordan Renaudon, Saint Cyr sur Loire (FR); Bruno Montboeuf, Saint-Cyr-sur-Loire (FR)

(73) Assignee: AKTIEBOLAGET SKF, Gothenburg (SE)

( * ) Notice: Subject to any disclaimer, the term of this patent is extended or adjusted under 35 U.S.C. 154(b) by 35 days.

(21) Appl. No.: 18/617,720

(22) Filed: Mar. 27, 2024

(65) Prior Publication Data

US 2024/0344565 A1      Oct. 17, 2024

(30) Foreign Application Priority Data

Apr. 12, 2023      (FR) ...................................... 2303606

(51) Int. Cl.
*F16C 33/66*            (2006.01)

(52) U.S. Cl.
CPC ...... *F16C 33/6618* (2013.01); *F16C 2326/05* (2013.01)

(58) Field of Classification Search
CPC ... F16C 19/163; F16C 33/6618; F16C 33/761
See application file for complete search history.

(56) References Cited

U.S. PATENT DOCUMENTS

| | | | |
|---|---|---|---|
| 8,506,171 B2 | 8/2013 | Stautner et al. | |
| 9,856,917 B1 * | 1/2018 | Vidyasagar | ......... F16C 33/7886 |
| 10,518,598 B1 * | 12/2019 | Shaikh | ................ F16C 33/7853 |
| 11,168,738 B2 | 11/2021 | Yan et al. | |
| 11,958,235 B2 * | 4/2024 | Dudley | ................. B33Y 30/00 |
| 2011/0311177 A1 | 12/2011 | Viault et al. | |
| 2013/0277161 A1 | 10/2013 | Bussit et al. | |
| 2015/0247533 A1 | 9/2015 | Fickert-Guenther et al. | |
| 2018/0372152 A1 | 12/2018 | Gaultier et al. | |

(Continued)

FOREIGN PATENT DOCUMENTS

| | | |
|---|---|---|
| CN | 102434575 A | 5/2012 |
| DE | 202010008769 U1 | 1/2012 |

(Continued)

OTHER PUBLICATIONS

Translation of DE102012208056 obtained Jun. 26, 2025.*

(Continued)

*Primary Examiner* — James Pilkington
(74) *Attorney, Agent, or Firm* — J-TEK LAW PLLC; Scott T. Wakeman; Mark A. Ussai

(57)            ABSTRACT

A suspension bearing unit includes a lower support cap, an upper bearing cap, at least one bearing disposed between the lower support cap and the upper bearing cap, and at least one gasket overmolded to the upper bearing cap and having a sealing portion extending toward the lower support cap and forming a seal with a portion of the lower support cap. The upper bearing cap includes an external skirt radially surrounding the at least one gasket. Also a method of forming the unit.

13 Claims, 4 Drawing Sheets

(56) References Cited

U.S. PATENT DOCUMENTS

| 2021/0222732 | A1 | | 7/2021 | Blanchard et al. | |
| 2024/0344566 | A1 | * | 10/2024 | Lepine | F16C 35/06 |

FOREIGN PATENT DOCUMENTS

| DE | 102012208056 | A1 | * | 11/2013 | .......... F16C 33/7846 |
| DE | 102017204818 | A1 | | 9/2018 | |
| DE | 102020201404 | A1 | | 8/2021 | |
| DE | 102020202617 | A1 | | 9/2021 | |
| EP | 3626486 | A1 | | 3/2020 | |
| FR | 3103018 | A1 | | 5/2021 | |
| JP | 2021143734 | A | * | 9/2021 | ............ F16C 33/761 |
| KR | 20220043337 | A | * | 4/2022 | ............ F16C 33/761 |

OTHER PUBLICATIONS

Translation of KR20220043337 obtained Oct. 6, 2025.*
Preliminary Search Report from the French Patent Office dated Sep. 30, 2023 in related French application No. FR2303606, including Search Report and Written Opinion.
Unpublished U.S. Appl. No. 18/617,698, first named inventor: Thomas Lepine, filed Mar. 27, 2024.
Unpublished U.S. Appl. No. 18/617,954, first named inventor: Thomas Lepine, filed Mar. 27, 2024.
Office Action from the United States Patent Office mailed Aug. 11, 2025 in related U.S. Appl. No. 18/617,698.
Office Action from the United States Patent Office mailed Mar. 27, 2024 in related U.S. Appl. No. 18/617,954.

* cited by examiner

SUSPENSION BEARING UNIT WITH GASKET AND METHOD OF FORMING SAME

This application claims priority to French patent application no. 2303606 filed on Apr. 12, 2023, the contents of which are fully incorporated herein by reference.

TECHNOLOGICAL FIELD

The present disclosure is directed to suspension bearing units used in particular in the suspension struts of the steered wheels of motor vehicles.

BACKGROUND

A suspension bearing unit generally comprises an axial thrust bearing and upper and lower caps that form a housing for the rings of the bearing and provide an interface between the rings and neighboring elements.

A suspension bearing unit is disposed at the upper part of the suspension strut between a suspension spring and the bodyshell of the vehicle. The suspension spring is mounted around a shock-absorber piston rod, the end of which is connected to the bodyshell of the vehicle. The suspension spring, of the helical spring type, bears axially, directly or indirectly, on the lower cap of the suspension bearing unit.

The suspension bearing unit makes it possible to transmit axial and radial loads between the suspension spring and the bodyshell of the vehicle while still allowing a relative rotational movement between the lower cap and the upper cap arising from a turn of the steered wheels of the vehicle and/or from the compression of the suspension spring.

In general, the upper cap of the suspension bearing unit is provided with a plurality of hooks that are disposed on an external skirt and are designed to diametrically engage with a plurality of hooks of the lower cap. The hooks of each cap are spaced from one another in the circumferential direction.

The hooks form retaining means for axially retaining the upper and lower caps in relation to one another. These hooks also form narrow passages in order to limit the intrusion of contaminating particles radially between the external skirt of the upper cap and the lower cap.

However, such a suspension bearing unit may be exposed to various types of contamination.

Specifically, contaminating particles can easily infiltrate between the external skirt of the upper cap and the lower cap and then move towards the bearing and introduced into the latter.

To overcome this drawback, patent application DE-A1-10 2020 201 404 discloses the provision of an external gasket which is fixed by clamping between the bearing and the lower cap of the suspension bearing unit and which includes at least one sealing lip interacting with the upper cap.

SUMMARY

The present disclosure is directed to a suspension bearing unit comprising a lower support cap, an upper bearing cap, and at least one bearing disposed between the caps. According to a general feature, the unit comprises at least one gasket overmolded on the upper bearing cap that has a sealing portion extending in the direction of the lower support cap in order to form a seal with the lower support cap. The upper bearing cap comprises an external skirt radially surrounding the gasket.

The overmolding of the gasket makes it possible to eliminate an operation during the assembly of the bearing unit. Moreover, this also makes it possible to eliminate a packaging element for the gasket that might be required if the gasket were to be provided separately from the bearing unit.

Furthermore, the external skirt of the upper bearing cap radially surrounding the gasket protects it while the suspension bearing unit is being handled, notably from shocks while it is being transported.

In a first embodiment, the sealing portion of the gasket forms a narrow-passage seal with the lower support cap.

In an alternative second embodiment, the sealing portion of the gasket forms a rubbing-contact seal with the lower support cap.

In an alternative third embodiment, the sealing portion of the gasket forms both a narrow-passage seal and a rubbing-contact seal with the lower support cap.

According to a first design, the sealing portion of the gasket extends purely axially.

According to an alternative second design, the sealing portion of the gasket extends obliquely towards the lower support cap.

Advantageously, at least one recess is formed on the sealing portion and is open towards the lower support cap, the recess being filled with lubricant which forms the seal with the lower support cap.

The lubricant-filled recess of the sealing portion ensures sealing between the sealing portion of the gasket and the lower support cap by forming a barrier for stopping contaminating particles from moving towards the bearing. In addition, the lubricant reduces rubbing between the sealing portion of the gasket and the lower support cap, reducing the wear of the gasket and the friction torque of the bearing unit.

According to a first design, the sealing portion of the gasket remains at a distance from (spaced from) the lower support cap. In this case, only the lubricant comes into contact with the lower support cap.

According to an alternative second design, the sealing portion of the gasket may bear against the lower support cap.

Advantageously, the recess of the sealing portion of the gasket is annular. This further improves the sealing of the bearing unit insofar as the lubricant can form a bead around 360°.

Advantageously, the sealing portion of the gasket comprises an axial skirt which radially surrounds the recess. The axial skirt forms a barrier for stopping the contaminating particles before they reach the recess of the sealing portion of the gasket. The service life and the effectiveness of the lubricant are thus improved. In one embodiment, the recess of the sealing portion of the gasket is open both radially and axially with respect to the lower support cap, the recess being formed at a free end of the sealing portion.

The sealing portion of the gasket may comprise at least one bead protruding radially towards the lower support cap, the bead at least partially delimiting the recess.

In a particular embodiment, the unit comprises at least first and second recesses that are formed on the sealing portion of the gasket and are filled with lubricant, the second recess being axially offset with respect to the first recess on the side of the upper bearing cap and radially offset with respect to the first recess on the side of the lower support cap, the first and second recesses immediately following one another in the axial direction.

The first and second lubricant-filled recesses further improve the sealing between the sealing portion of the gasket and the lower support cap.

Advantageously, the gasket comprises an annular heel overmolded on the upper bearing cap, the sealing portion extending from the annular heel.

Advantageously, the external skirt of the upper bearing cap comprises a beveled inner surface, the inner surface being situated axially away from the lower support cap, the annular heel of the gasket being in contact with the beveled inner surface of the external skirt of the upper bearing cap. The beveled inner surface makes it possible to improve the engagement of the gasket with the external skirt of the bearing cap and makes it easier to overmold the gasket.

Advantageously, the free end of the external skirt of the upper bearing cap is offset axially downwardly with respect to the free end of the sealing portion of the gasket.

Advantageously, the upper bearing cap comprises at least one engaging groove, the gasket being partially overmolded in the engaging groove.

The engaging groove further improves the engagement of the gasket with the upper bearing cap and makes it easier to overmold the gasket.

Advantageously, the sealing portion of the gasket allows an annular space to remain between the recess and the lower support cap.

BRIEF DESCRIPTION OF THE FIGURES

The present invention will be better understood on studying the detailed description of embodiments, given by way of non-limiting example and illustrated by the appended drawings, in which.

DETAILED DESCRIPTION

Figure 1:
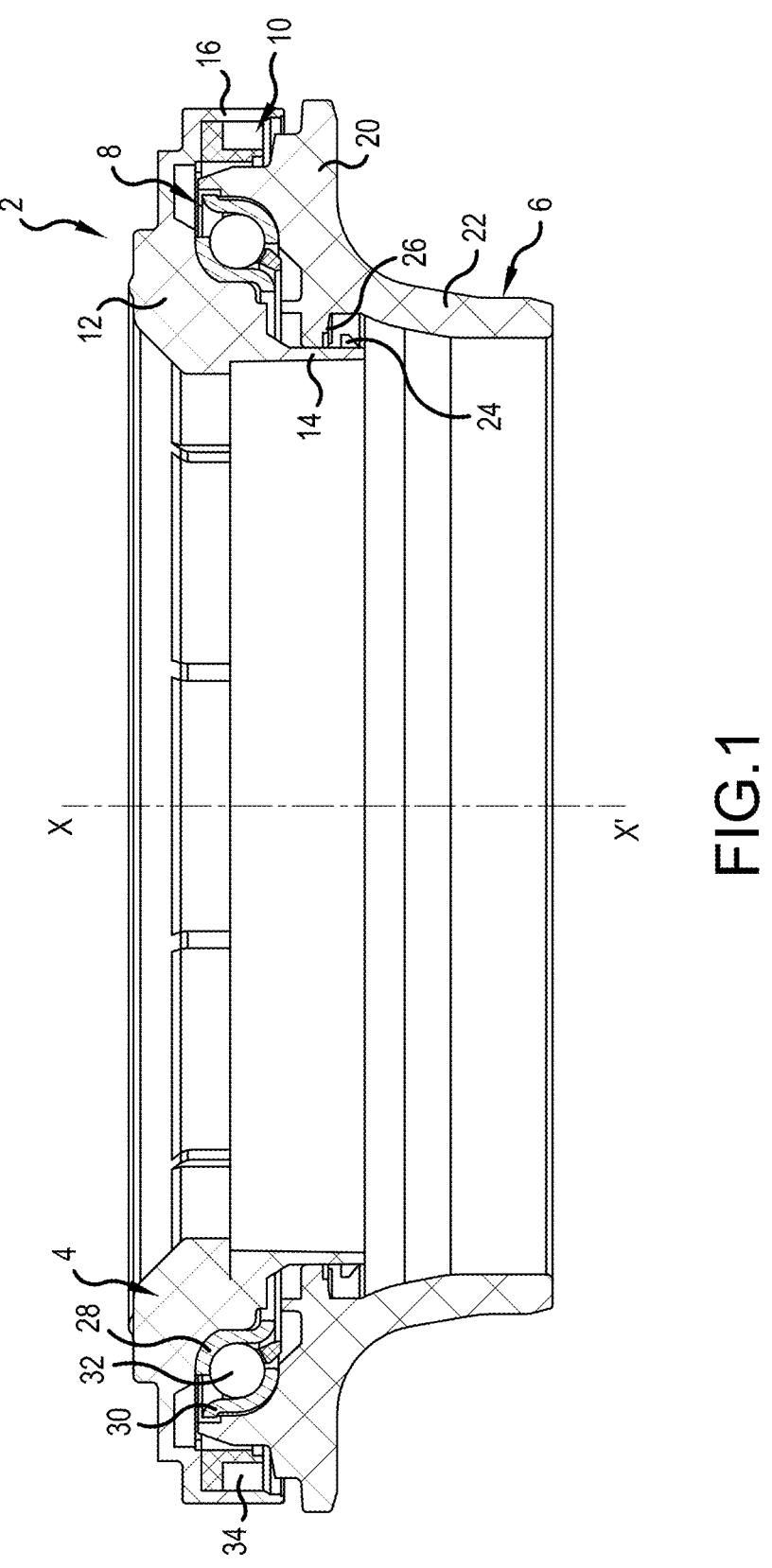
FIG. 1 is an axial sectional view of a suspension bearing unit according to a first exemplary embodiment of the invention.

The suspension bearing unit 2 shown in FIG. 1 is suitable for installation between a cap or upper bearing seat coming into contact with a fixed chassis element of a motor vehicle and a helical suspension spring. In FIG. 1, the unit 2 is shown in an assumed vertical position.

The unit 2, of axis X-X', comprises an upper bearing cap 4, a lower support cap 6, and a rolling bearing 8 interposed axially between the caps 4, 6. In the example illustrated, the upper bearing cap 4 and the lower support cap 6 are mounted in direct contact with the bearing 8 without an interposed intermediate element. In a variant, the upper bearing cap 4 and the lower support cap 6 may be mounted in indirect contact with the bearing 8 with an interposed intermediate element.

As will be described in more detail later on, the bearing unit 2 moreover comprises an external annular gasket 10 for preventing the intrusion of contaminants towards the bearing 8. The gasket 10 is overmolded on the upper bearing cap 4 and extends towards the lower support cap 6.

The upper bearing cap 4 may advantageously be formed as a single piece, for example made of plastic, for example such as polyamide (PA) 6.6, which may optionally be reinforced with glass fibers.

The upper bearing cap 4, of axis X-X', comprises a radial portion 12, an annular axial internal skirt 14, and an annular axial external skirt 16 radially surrounding the internal skirt 14. The radial portion 12 of the upper bearing cap 4 has an upper surface (not provided with a reference sign) intended to face the upper bearing seat and an opposite lower surface (not provided with a reference sign) in contact with the bearing 8. The upper and lower surfaces define the thickness of the radial portion 12 of the upper bearing cap 4. In the example illustrated, the radial portion 12 of the upper bearing cap 4 has a stepped form. In the example illustrated, the gasket 10 is overmolded on the radial portion 12 of the upper bearing cap 4.

The external skirt 16 of the upper bearing cap 4 partially radially surrounds the lower support cap 6, and the external skirt 16 extends axially from the radial portion 12 of the upper bearing cap 4. In the example illustrated, the external skirt 16 of the upper bearing cap 4 extends from a large-diameter edge of the radial portion 12 of the upper bearing cap 4. The external skirt 16 radially surrounds the gasket 10.

The internal skirt 14 of the upper bearing cap 4 extends inside the bore of the lower support cap 6. The internal and external skirts 14, 16 of the upper bearing cap 4 extend axially downwards from the radial portion 12 of the upper bearing cap 4. The internal skirt 14 extends from a small-diameter edge of the radial portion 12 of the upper bearing cap 4.

The lower support cap 6, of axis X-X', comprises an annular radial portion 20 in the form of a plate and an annular axial skirt 22 extending from a small-diameter edge of the radial portion 20 of the lower support cap 6. The skirt 22 of the lower support cap 6 extends axially away from the upper bearing cap 4 and the bearing 8. The skirt 22 of the lower support cap 6 makes it possible to center the suspension spring. The radial portion 20 of the lower support cap 6 has a lower annular radial surface delimiting a bearing surface for the suspension spring.

The upper bearing cap 4 comprises a plurality of internal hooks 24 that are disposed on the internal skirt 14 of the upper bearing cap 4 and extend radially outwards in the direction of the lower support cap 6. In the example illustrated, the hooks 24 are spaced from one another in the circumferential direction. In a variant, it could be possible to provide a single annular hook 24.

The lower support cap 6 comprises a plurality of internal hooks 26 that are disposed on the radial portion 20 of the lower support cap 6 and extend radially inwards in the direction of the upper bearing cap 4, the plurality of internal hooks 26 being designed to diametrically engage with the plurality of internal hooks 24 of the upper bearing cap 4. In a variant, it could be possible to provide a single annular hook 26. The hooks 24, 26 form retaining means for axially retaining the upper bearing cap 4 and lower support cap 6 in relation to one another.

The bearing 8 is situated entirely radially between the skirts 14, 16 of the upper bearing cap 4. The bearing 8 comprises an upper ring 28 in contact with the upper bearing cap 4, a lower ring 30 in contact with the lower support cap 6, and a row of rolling elements 32, in this case balls, that are disposed between raceways formed on the rings 28, 30. In the example illustrated, the rolling bearing is of the angular contact type. The upper ring 28 is in contact with the lower surface of the radial portion 12 of the upper bearing cap 4. The lower ring 30 is in contact with an upper surface of the lower support cap 6, the upper surface having a complementary shape to the lower ring 30 of the bearing 8.

The lower support cap 6 in this case is formed as a body formed in a single piece, for example made of plastic, for example such as polyamide (PA) 6.6, which may optionally be reinforced with glass fibers.

There is an annular radial space 34 between the lower support cap 6 and the external skirt 16 of the upper bearing cap 4.

Figure 2:
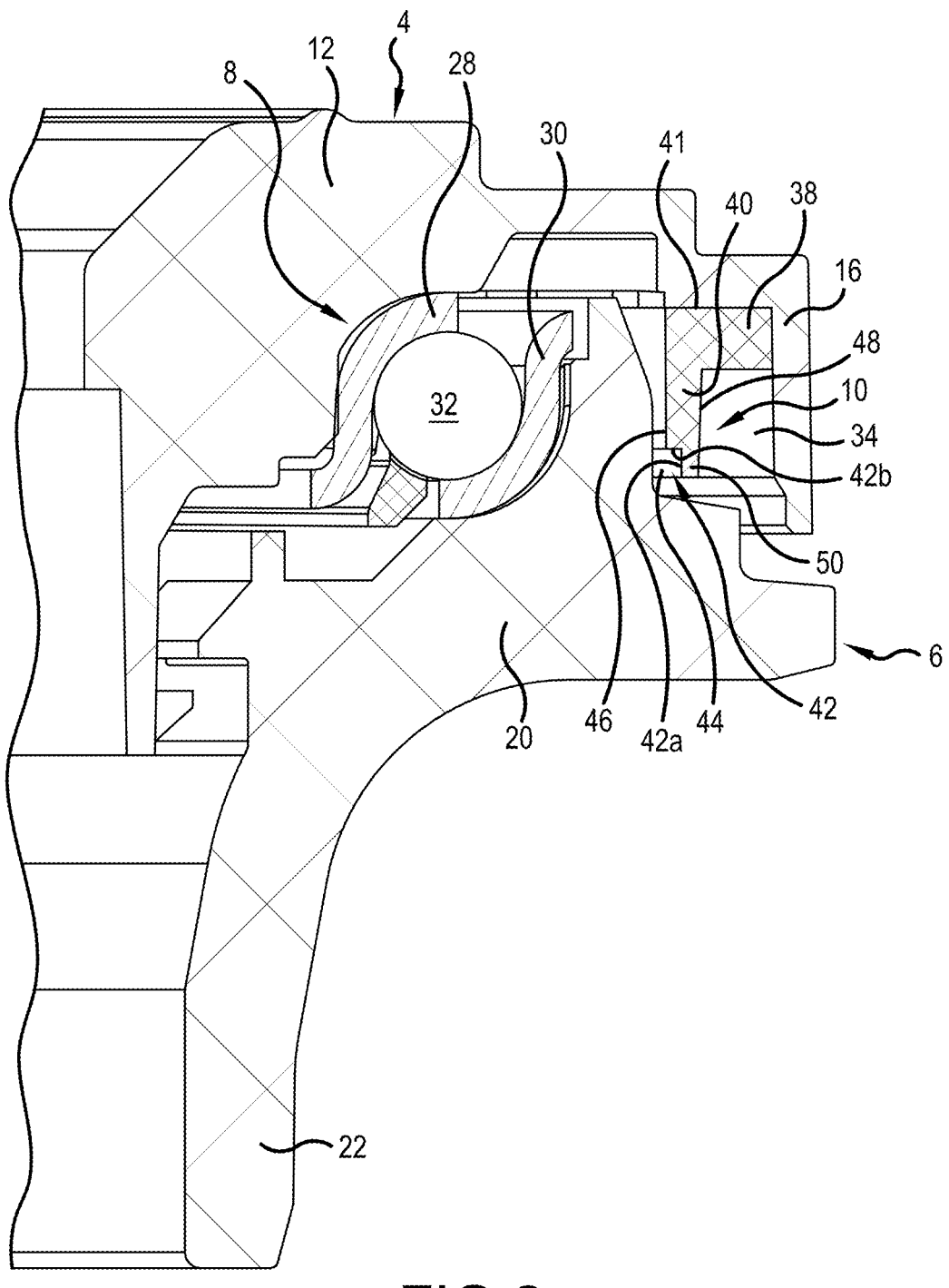
FIG. 2 is a detail view of a portion of the device of FIG. 1.

The gasket 10 is annular and radially surrounds the lower support cap 6. The gasket 10 is overmolded on the upper bearing cap 4 so as to be mounted radially around the bearing 8 and the outer surface of the lower support cap 6. As illustrated more clearly in FIG. 2, the gasket 10 comprises an annular heel 38 overmolded on the upper bearing cap 4 and an annular sealing portion 40 that extends from the heel 38 toward the lower support cap 6. The annular sealing portion 40 includes a free end axially spaced from the heel 38 and a cylindrical inner surface 46.

In order to improve the engagement of the annular heel 38 of the gasket 10 on the upper bearing cap 4, a plurality of engaging grooves 41 are formed on the upper bearing cap 4. In the embodiment illustrated, the engaging grooves 41 are evenly spaced in the circumferential direction and extend radially. The annular heel 38 of the gasket 10 is overmolded in the engaging grooves 41. In a variant, it is possible to provide engaging grooves 41 unevenly spaced in the circumferential direction or a single annular engaging groove 41.

In the exemplary embodiment illustrated, a recess 42 is formed on the sealing portion 40 of the gasket 10 which recess is open radially towards the lower support cap 6 and which recess 42 may be referred to hereinafter as an annular groove. There is an annular space between the recess 42 of the sealing portion 40 and the lower support cap 6. The recess 42 of the sealing portion 40 is filled with a lubricant 44 which forms a seal by contacting the lower support cap 6. The lubricant 44 comes into contact with the lower support cap 6. The lubricant 44 may be, for example, grease.

The lubricant 44 filling the recess 42 of the sealing portion 40 ensures good sealing properties between the sealing portion 40 of the gasket 10 and the lower support cap 6. The lubricant 44 also makes it possible to obtain a bearing unit 2 having a reduced friction torque. The lubricant 44 closes the annular radial space between the sealing portion 40 of the gasket 10 and the lower support cap 6.

The sealing portion 40 of the gasket 10 extends in this case purely axially from the heel 38 of the gasket 10. In a variant, the sealing portion 40 of the gasket 10 can extend both axially towards the lower support cap 6 and radially inwards.

The sealing portion 40 of the gasket 10 has a cylindrical axial inner surface 46 forming a bore and an opposite cylindrical axial outer surface 48. The inner surface 46 and the outer surface 48 delimit the radial thickness of the sealing portion 40 of the gasket 10.

The sealing portion 40 of the gasket 10 comprises an axial skirt 50 radially surrounding the recess 42 of the sealing portion 40, and the axial skirt 50 forms a barrier stopping the contaminating particles that pass through the radial space 34 before they reach the recess 42 of the sealing portion 40.

The recess 42 of the sealing portion 40 is annular in this embodiment. The recess 42 is delimited in the radial direction by an annular axial surface 42a of the sealing portion 40 and in the axial direction by an annular radial surface 42b of the sealing portion 40. The annular radial surface 42b extends radially outwardly from the axial inner surface 46 of the sealing portion 40. The annular axial surface 42a extends axially from a large-diameter edge of the annular radial portion 42b of the sealing portion 40 toward the axial free end of the sealing portion 40. The axial surface 42a delimits the skirt 50 radially on the inner side.

The free end of the external skirt 16 of the upper bearing cap 4 is offset axially downwardly with respect to the free end of the sealing portion 40 of the gasket 10. The external skirt 16 of the upper bearing cap 4 thus forms a barrier stopping the contaminating particles that move towards the gasket 10.

In a variant, the sealing portion 40 may comprise a plurality of recesses 42 open towards the lower support cap 6, each recess 42 extending along a sector which is limited in the circumferential direction, the recesses 42 of the sealing portion 40 being formed at identical or different axial positions.

In the example shown, the recess 42 of the sealing portion 40 is formed at the free axial end of the sealing portion 40 of the upper bearing cap 10, the free axial end being opposite the heel 38 of the gasket 10, the recess 42 of the sealing portion 40 being open both radially inwards and axially towards the lower support cap 6. In a variant, the recess 42 of the sealing portion 40 may be open solely radially inwards with respect to the lower support cap 6.

The gasket 10 may, for example, be made from an elastically deformable material, for example from nitrile or elastomer. The gasket 10 may also be made of a stiffer material, for example polyoxymethylene (POM) or steel.

Figure 3:
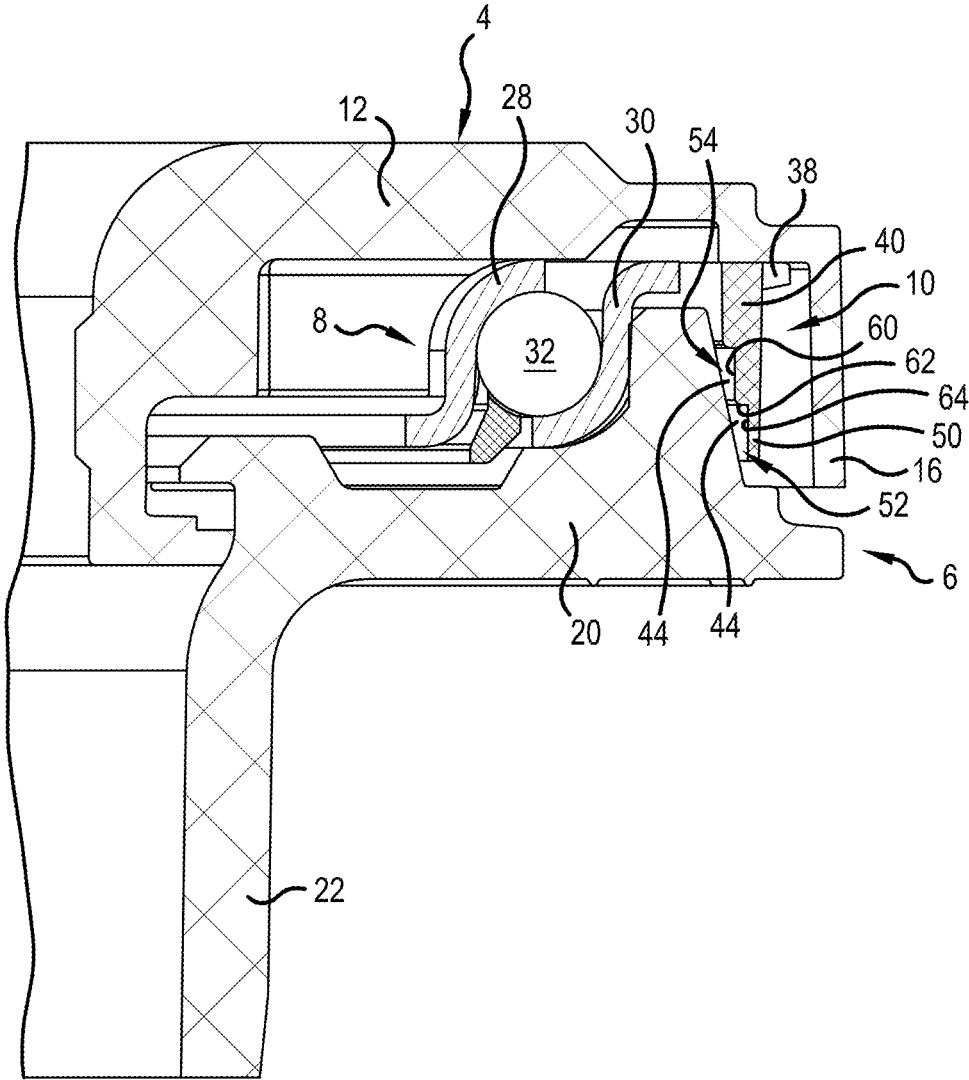
FIG. 3 is an axial sectional view of a portion of a suspension bearing unit according to a second exemplary embodiment of the invention.

The exemplary embodiment illustrated in FIG. 3, in which identical elements bear the same references, differs from the preceding example in that the sealing portion 40 of the gasket 10 comprises a plurality of annular recesses 52, 54 open towards the lower support cap 6. A first recess 52 and a second recess 54 are formed on the sealing portion 40 of the gasket 10 and filled with lubricant 44. The second recess 54 is axially offset with respect to the first recess 52 on the side of the upper bearing cap 4. The second recess 54 is radially offset with respect to the first recess 52 on the side of the lower support cap 6.

The first and second recesses 52, 54 follow one another directly in the axial direction. An annular axial surface 60 of the sealing portion 40 that delimits the second recess 54 in the radial direction extends from an annular radial surface 62 of the sealing portion 40 that delimits the first recess 52 in the axial direction.

An annular axial surface 64 of the sealing portion 40 that delimits the first recess 52 in the radial direction is radially outwardly offset with respect to the axial surface 60 of the sealing portion 40 that delimits the second recess 54 in the radial direction. The axial surface 60 extends axially from a small-diameter edge of the radial surface 62, whereas the axial surface 64 extends axially from a large-diameter edge of the radial surface 62.

In a variant, it is possible for the first and second recesses 52, 54 to not follow one another directly, that is to say to be axially spaced from one another, and/or the sealing portion 40 of the gasket 10 may comprise more than two recesses.

Figure 4:
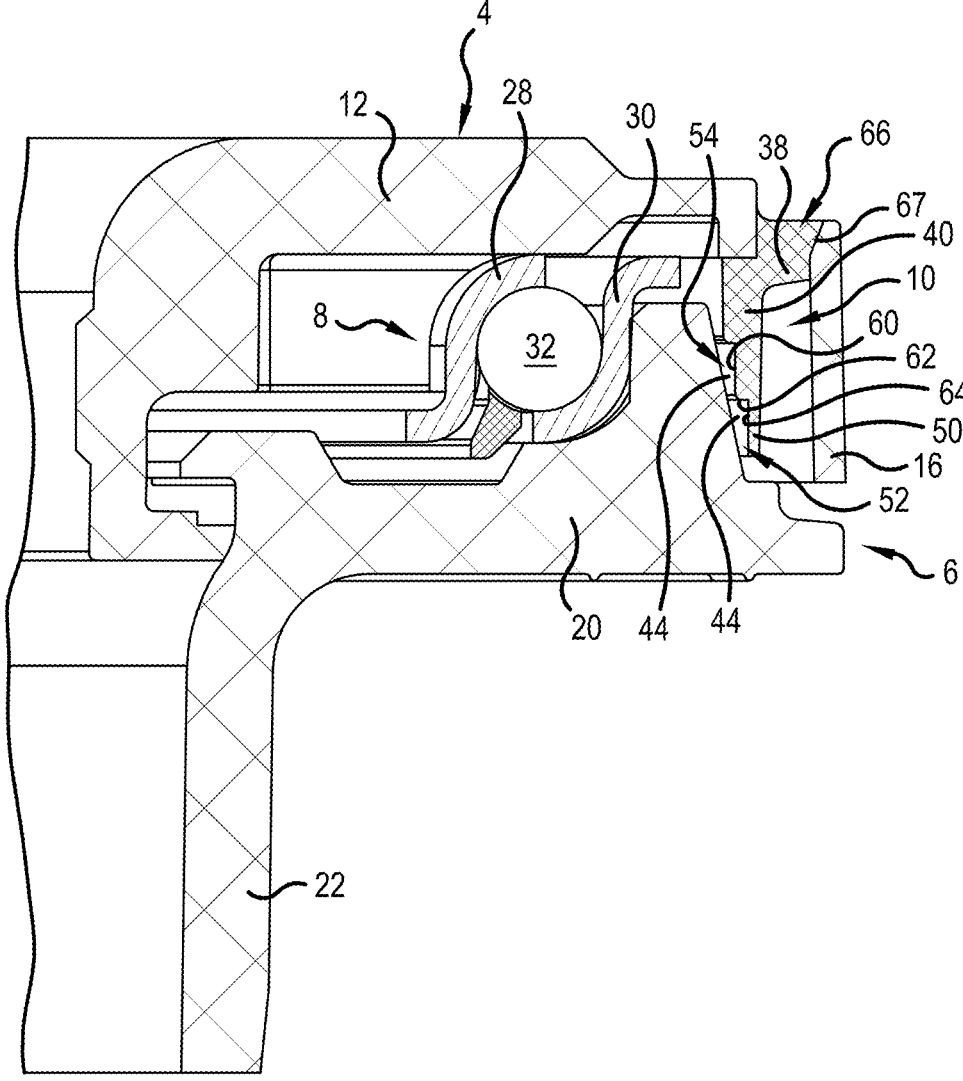
FIG. 4 is an axial sectional view of a portion of a suspension bearing unit according to a third exemplary embodiment of the invention.

The exemplary embodiment illustrated in FIG. 4, in which identical elements bear the same references, differs from the second exemplary embodiment in that the external skirt 16 of the upper bearing cap 4 comprises through-openings 66 for use in the process of overmolding the gasket 10 to the upper bearing cap 4. The heel 38 of the gasket 10 is overmolded on the external skirt 16 of the upper bearing cap 4 so as to extend into the through-openings 66, improving the engagement of the heel 38 of the gasket 10 with the external skirt 16 of the upper bearing cap 4.

The through-openings 66 of the external skirt 16 of the upper bearing cap 4 each have outwardly beveled, annular inner surfaces 67, and these inner surfaces may be referred to as "through-opening surfaces". The beveled inner surfaces 67 of the external skirt 16 are situated axially away from the lower support cap 6. The heel 38 of the gasket 10 is overmolded on the external skirt 16 of the upper bearing cap 4 so as to extend against the beveled inner surfaces 67 of the external skirt 16 of the upper bearing cap 4, improving the engagement of the heel 38 of the gasket 10 with the external skirt 16 of the upper bearing cap 4. In a variant, the external skirt 16 of the upper bearing cap 4 may comprise a plurality of beveled inner surfaces 67 extending along a sector which is limited in the circumferential direction.

Optionally, the sealing portion 40 of the gasket 10 may include an annular bead or a plurality of beads (not shown) each extending along a sector which is limited in the circumferential direction and protruding radially towards the lower support cap 6 while remaining at a radial distance therefrom. The bead may be axially offset from the free end of the sealing portion 40 of the gasket 10 such that the recess 42 is formed on the sealing portion 40 of the gasket 10 axially below the bead. In other words, the bead can axially delimit the recess 42 of the sealing portion 40, the inner surface 46 of the sealing portion 40 then radially delimiting the recess 42 on the inner side.

Advantageously, lubricant 44 may also be disposed radially between the bead and the outer surface of the lower support cap 6 in order to further improve the sealing of the bearing unit 2.

In a variant, the sealing portion 40 of the gasket 10 may comprise a plurality of beads at various axial positions that protrude radially towards the lower support cap 6, and a plurality of radial recesses 42.

In the exemplary embodiments illustrated, the sealing portion 40 of the gasket includes at least one recess. As an alternative, the sealing portion 40 of the gasket may be devoid of a recess.

In the exemplary embodiments illustrated, the bearing unit 2 comprises a single external gasket 10 situated radially between the support cap 6 and the external skirt 16 of the upper bearing cap 4. In combination, the bearing unit 2 may comprise an internal gasket 10 situated radially between the support cap 6 and the internal skirt 14 of the upper bearing cap 4.

In the exemplary embodiments illustrated, the bearing unit 2 comprises a single external gasket 10 provided with a single sealing portion 40. In a variant, the bearing unit 2 may comprise a plurality of external gaskets 10 or a single gasket 10 provided with a plurality of sealing portions 40.

In the exemplary embodiments illustrated, the bearing unit 2 comprises an angular contact rolling bearing 8 provided with a row of balls. The bearing unit 2 may comprise other types of rolling bearings, for example a bearing of the four-point contact type and/or with at least two rows of balls. The rolling bearing may comprise other types of rolling elements 32, for example rollers. In another variant, the bearing of the bearing unit 2 may comprise a sliding bearing devoid of rolling elements and provided with one or more rings.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved suspension bearing units.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A suspension bearing unit comprising:
   a lower support cap,
   an upper bearing cap,
   at least one bearing disposed between the lower support cap and the upper bearing cap, and
   at least one gasket overmolded to the upper bearing cap and having an annular sealing portion extending toward the lower support cap and forming a seal with a portion of the lower support cap, the annular sealing portion extending purely axially and having a free end and a cylindrical inner surface facing the lower support cap,
   wherein the upper bearing cap includes an external skirt radially surrounding the at least one gasket,
   wherein the cylindrical inner surface includes at least one annular groove open radially toward a first portion of the lower support cap, and
   wherein the at least one annular groove is filled with lubricant such that the lubricant forms the seal with the lower support cap.

2. The suspension bearing unit according to claim 1,
   wherein the at least one annular groove comprises a first annular groove and a second annular groove, and
   wherein the second annular groove is axially and radially offset from the first annular groove.

3. The suspension bearing unit according to claim 1,
   wherein the upper bearing cap includes at least one through-opening, and
   wherein a portion of the at least one gasket is overmolded in the at least one through-opening.

4. The suspension bearing unit according to claim 3,
   wherein the at least one through-opening is bounded by a through-opening surface and wherein a portion of the through-opening surface at an axial end of the though-opening is beveled.

5. The suspension bearing unit according to claim 3,
   wherein the upper bearing cap includes at least one engaging groove, and
   wherein the gasket is partially overmolded in the engaging groove.

6. A suspension bearing unit comprising:
   a lower support cap,
   an upper bearing cap, at least one bearing disposed between the lower support cap and the upper bearing cap, and at least one gasket overmolded to the upper bearing cap and having an annular sealing portion extending toward the lower support cap and forming a seal with a portion of the lower support cap, the annular sealing portion extending purely axially and having a free end and a cylindrical inner surface facing the lower support cap, wherein the upper bearing cap includes an external skirt radially surrounding the at least one gasket, wherein the cylindrical inner surface includes at least one annular groove open radially toward a first portion of the lower support cap, wherein the external skirt extends purely axially, and wherein an axial length of the external skirt is greater than an axial length of the annular sealing portion.

7. A method of forming a suspension bearing unit comprising:

providing a lower support cap, providing an upper bearing cap having an external skirt, providing at least one bearing between the lower support cap and the upper bearing cap, and overmolding at least one gasket to the upper bearing cap, the at least one gasket having an annular sealing portion extending toward the lower support cap and forming a seal with a portion of the lower support cap, wherein the upper bearing cap and the at least one gasket are configured such that the external skirt radially surrounds the at least one gasket, wherein the annular sealing portion extends purely axially and has a free end and a cylindrical inner surface facing the lower support cap, wherein the cylindrical inner surface includes at least one annular groove open radially toward a first portion of the lower support cap, and wherein the at least one annular groove is open axially toward a second portion of the lower support cap.

8. The method according to claim 7, wherein the upper bearing cap includes at least one through-opening, and wherein the overmolding forms a portion of the at least one gasket in the at least one through-opening.

9. The method according to claim 8, wherein the at least one through-opening is bounded by a through-opening surface and wherein a portion of the through-opening surface at an axial end of the through-opening is beveled.

10. The method according to claim 7, including filling the at least one annular groove with lubricant such that the lubricant forms the seal with the lower support cap.

11. The method according to claim 7, wherein the at least one annular groove comprises a first annular groove and a second annular groove, and wherein the second annular groove is axially and radially offset from the first annular groove.

12. A suspension bearing unit comprising:

a lower support cap, an upper bearing cap, at least one bearing disposed between the lower support cap and the upper bearing cap, and at least one gasket overmolded to the upper bearing cap and having an annular sealing portion extending toward the lower support cap and forming a seal with a portion of the lower support cap, the annular sealing portion extending purely axially and having a free end and a cylindrical inner surface facing the lower support cap, wherein the upper bearing cap includes an external skirt radially surrounding the at least one gasket, wherein the cylindrical inner surface includes at least one annular groove open radially toward a first portion of the lower support cap, wherein the cylindrical inner surface is spaced from the first portion of the lower support cap and the free end is axially spaced from a second portion of the lower support cap, and wherein the at least one annular groove is open axially toward the second portion of the lower support cap.

13. The suspension bearing unit according to claim 12, wherein a first one of the at least one annular groove is located directly radially outward of a rolling element of the at least one bearing.

* * * * *